INVENTORS
WINTHROP S. HORTON &
WALTER A. PARRISH
BY
Clifford L. Sadler
ATTORNEY

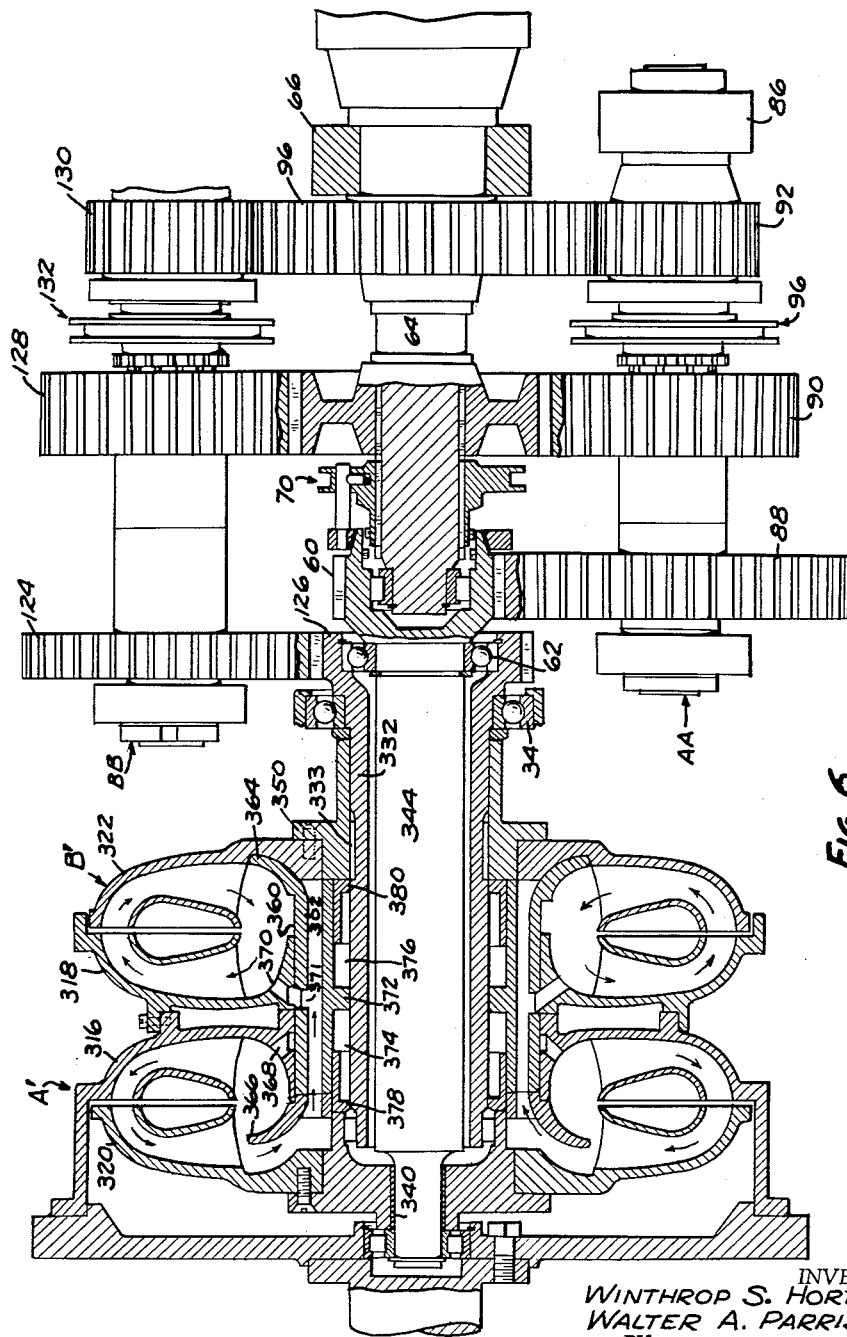

United States Patent Office 2,995,897
Patented Aug. 15, 1961

2,995,897
HYDRAULIC TRANSMISSION
Walter A. Parrish, Algonac, and Winthrop S. Horton, Farmington, Mich., assignors to Curtiss-Wright Corporation, a corporation of Delaware
Filed June 20, 1957, Ser. No. 666,819
3 Claims. (Cl. 60—54)

The present invention relates to power transmitting apparatus and more particularly to such a transmission employing hydraulic coupling units.

Present day automatic hydraulic transmissions employ the use of several band or disk type clutches for selectively establishing various gear ratios therethrough. Clutches of this type have wearing surfaces and rely on friction contact for their clutching effect. These friction surfaces tend to wear out and need frequent adjustment as well as replacement.

In view of this state of the art it is an object of the present invention to provide a hydraulic transmission which eliminates the need for conventional friction clutches.

It is a further object of the present invention to provide in such a transmission a plurality of hydraulic coupling units which function through reduction gearing independently associated with each unit.

It is a further object of the present invention to provide in an automatic transmission side by side hydraulic coupling units having crossover valves for the purpose of expelling the hydraulic fluid from one unit into the other to effect a shift or change in gear ratio.

These and further objects of the present invention will become apparent from the following description and the accompanying drawings in which:

FIGURE 6 is an elevational view partly in section of a modified form of the transmission embodying the present invention.

Figure 1:
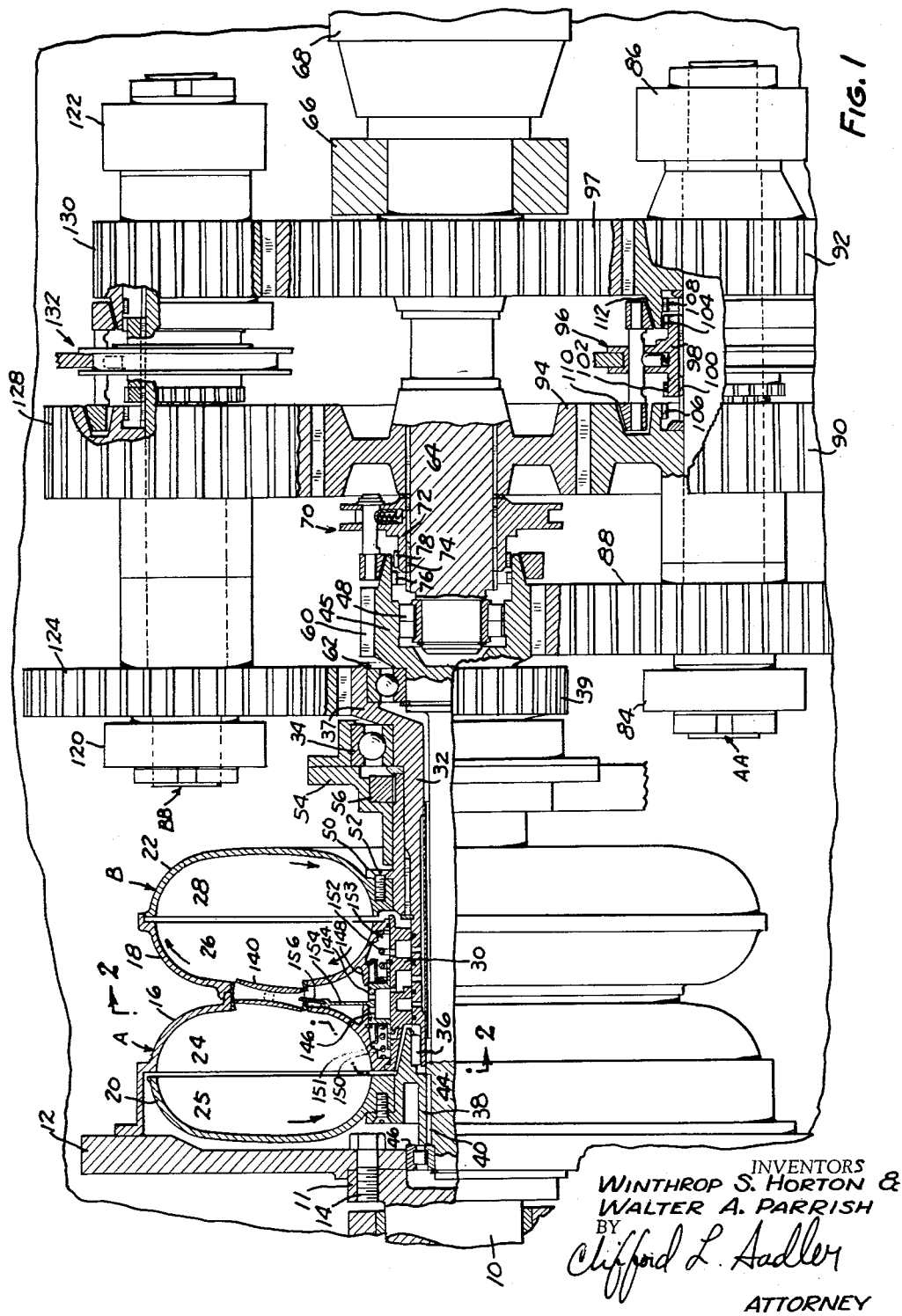
FIGURE 1 is an elevational view partly in section of a hydraulic transmission containing the present invention.

Referring now to the drawings for a more detailed description of the present invention wherein like reference numerals refer to like parts, FIGURE 1 discloses a transmission having two toroidally shaped hydraulic couplings A and B, each having vaned driving and driven halves. A driving shaft 10 from a prime mover not shown is connected to a disk shaped member 12 by means of bolts 14 circumferentially spaced apart about a flange 11 on the end of the shaft 10. Connected to the outer rim of the member 12 is a driving member 16 of the hydraulic coupling A which in turn has driving member 18 of coupling B secured to it. Driven member 20 completes the torous of coupling A as does driven member 22 complete the enclosure of coupling B. Within coupling A, vanes 24 are radially disposed and secured to driving member 16 as are blades 25 secured to driven member 20. In coupling B, blades 26 and 28 are similarly secured to members 18 and 22 respectively. Blades 24, 25, 26 and 28 are flat members circumferentially spaced apart and disposed in planes intersecting the common axis of rotation of the couplings A and B.

The combined driving elements 16 and 18 of couplings A and B are secured at their inner diameter to a generally cylindrically shaped member 30 which in turn is rotatably mounted on a hollow shaft 32 mounted within bearings 34 and 36 at its ends for rotation. Shaft 32 has a bell shaped end 37 formed to have an external gear 39.

The driven element 20 of coupling A is secured at its inner diameter to a member 38 which, in turn, is splined at 40 to solid shaft 44. Bearings are placed at 46 and at 62 to rotatively support the solid shaft 44.

Driven element 22 of coupling B is secured to an intermediate element 50 as by bolts 52 which in turn has splined engagement with hollow shaft 32. Positioned between element 50 and a portion of the stationary frame 54 of the transmission is hydraulic pump 56 of the Gerotor gear type. The pump 56 functions to replenish hydraulic fluid which is ordinarily lost through leakage. It directs fluid from a sump to the coupling units by means of passages not shown and provides fluid pressure for the transmission's control valves to be described.

Shaft 44 which is splined at one end to driven element 20 of coupling A has a gear 60 integral with opposite end and a bearing 62 disposed between it and the inner diameter of hollow shaft 32. Concentric within the cup-shaped end 45 of shaft 44 is a final driven shaft 64. Roller bearing 48 disposed between shafts 64 and the end 45 of shaft 44 allows relative movement between these units. The opposite end 68 of shaft 64 is supported by a bearing 66. A synchronizing clutch indicated generally at 70 provides a means for selectively securing of shafts 44 and 64 together.

Clutch element 72 slidably engages shaft 64 and is rotatively fast thereto by means of a splined engagement 74. The inner diameter of the cup-shaped end 45 of shaft 44 has internal engaging teeth 76 which are intended to mate with external teeth 78 on clutch element 72. A simple cone clutch 80 acts as a synchronizer tending to make the rotational speeds of shafts 44 and 64 the same when clutch 70 is shifted to the left as viewed in FIGURE 1. This well known function brings the shafts into a synchronized speed so that teeth 76 and 78 may be engaged to provide a direct mechanical hook-up between shafts 44 and 64.

Disposed on either side of driven shaft 64 are layshaft units AA and BB which are parallel to the axis of rotation of shaft 64. Layshaft AA has bearings 84 and 86 on each end thereof which provide for free rotational movement. These bearings are supported on the stationary frame of the transmission which is not shown. Keyed to layshaft AA is gear 88 which engages gear 60 of shaft 44. Freely mounted on layshaft AA are reduction gears 90 and 92 which engage gears 94 and 97 respectively splined to shaft 64. A synchronizing clutch indicated generally at 96, has its clutch element 98 splined at 100 to layshaft AA. On the outer diameter of each end of clutch element 98 are engaging teeth 102 and 104 which are intended to engage internal teeth 106 and 108 of gears 90 and 92. Cone clutches 110 and 112 are positioned to engage and synchronize the rotational speeds of layshaft AA and either of the gears 90 and 92 respectively. Synchronizing clutch 96 functions in a well known manner when it is shifted to the left to engage gear 90 with shaft AA or to the right to engage shaft AA with gear 92. Cone clutches 110 and 112 cause the selected gear to assume the same speed as the shaft AA just prior to the engagement of teeth 100 and 106 or teeth 104 and 108 to form a solid mechanical hook-up between the shaft AA and the selected reduction gear.

Layshaft BB functions in a manner similar to that of layshaft unit AA. Shaft BB is journalled at its outer ends by bearings 120 and 122 to allow for rotation. Keyed to shaft BB is gear 124 which engages teeth 39 of shaft 32. Freely mounted on shaft BB are reduction gears 128 and 130 which also mesh with gears 94 and 97 respectively of driven shaft 64. Synchronizing clutch 132 functions in a similar manner to that of clutch 96 previously described, to provide a mechanical hook-up between either shaft BB and gear 128 or shaft BB and reduction gear 130.

Figure 2:
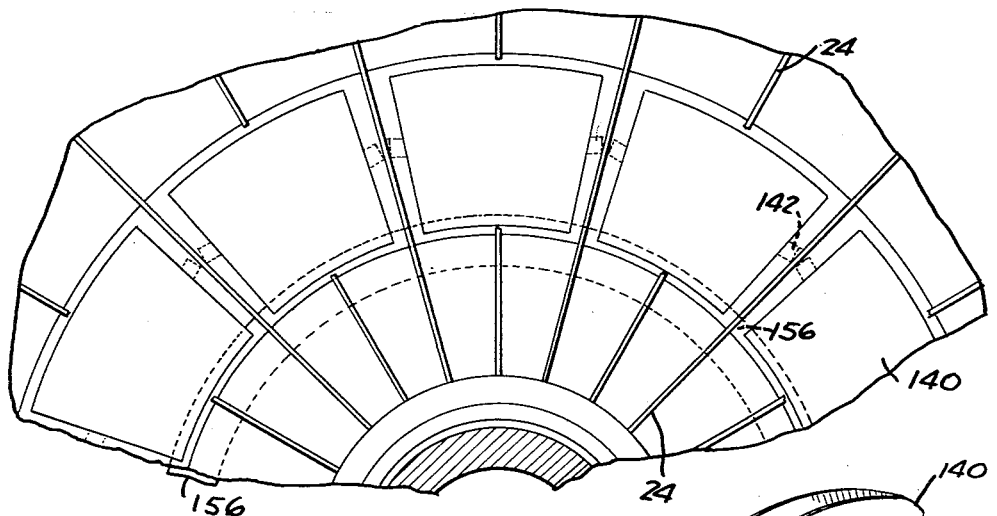
FIGURE 2 is a sectional view taken along lines 2—2 of FIGURE 1.
Figure 3:
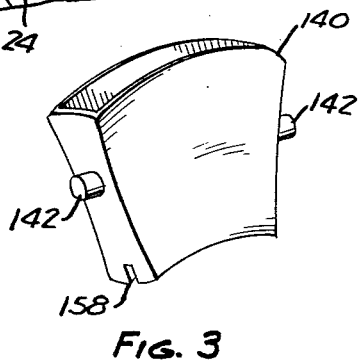
FIGURE 3 is an enlarged perspective view of the crossover valve unit shown in FIGURE 1.

Hydraulic units A and B provide a fluid coupling between driving shaft 10 and the output 68 of driven shaft 64 and in addition thereto, functions as a fluid clutch for selective engagement of the reduction of gears of either shafts AA or BB. The novel selecting means provided includes a crossover valve 140 provided for hydraulic communication between the fluid chambers A and B. FIGURE 3 discloses the configuration of crossover valve 140 and FIGURES 1 and 2 the spaced apart circumferential arrangement joining elements 16 and 18 of units A and B.

Where driving elements 16 and 18 meet in back to back relationship, openings are provided for the reception of a plurality of circumferentiallily-spaced apart crossover valves 140. These valves 140 have a general shape substantially similar to a truncated sector of a circle. The valves 140 are hollow open ended devices allowing radial fluid flow through their length. Their exterior surfaces are contoured to complement the adjacent surfaces of the elements 16 and 18. Stub shafts 142 extend from the radial sides of the valves 140 to allow pivotal movement.

Means are provided to allow the crossover valve 140 to cock in either of two directions as well as assume an intermediate position. Flanges 146 and 148 are provided on elements 16 and 18 to complete an annular chamber about member 30 and a piston 144 is mounted within the annular void between coupling elements 16 and 18 and member 30. Pressure chambers 151 and 153 are thus defined on either side of the piston 144. Centering springs 150 and 152 residing in the chambers 151 and 153 tend to force piston 144 to assume a neutral position in the absence of fluid pressure or in the presence of equal pressures on both of its sides. Fluid passages and control means are provided in a well known manner for the direction of fluid pressure to either side of piston 144.

Figure 4:
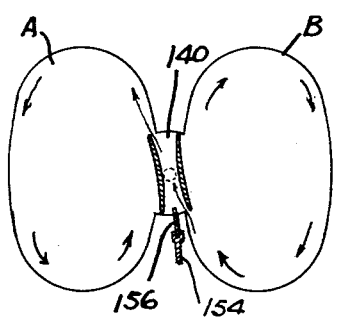
FIGURES 4 and 5 are schematic drawings disclosing the operation of the valve of FIGURE 3.
Figure 5:
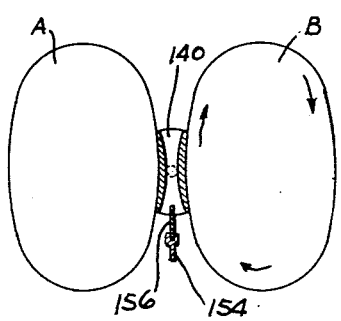

Connected to the piston 144 are a plurality of radial systems 154 for engagement with washer 156 which, in turn, engages slots 158 formed in the bottom of the crossover valves 140. When chambers 151 and 153 are void of pressure, piston 144 will assume a neutral position thus causing the crossover valve 140 to be centered in a position as seen in FIGURE 5. The application of pressure to chamber 153 forces the piston 144 to the left, cocking valve 140 in a clockwise position as seen in FIGURE 1. FIGURE 4 discloses the valve 140 cocked in a counterclockwise position resulting from the application of pressure to chamber 150. Washer 156 may be of the frustro-conical Belleville type, in which case valve 140 will swing to either of its limits with a smart snap-like action.

In operation, rotation of shaft 10 by a prime mover will cause driving elements 16 and 18 of couplings A and B to rotate. This, in turn, will force any hydraulic fluid in either of the couplings to be rotated. Fluid in torous A will be driven in a substantially counterclockwise direction, forcing driven element 20 to also rotate. The centrifugal action of element 16, and the blades 24 connected thereto, forces the fluid to rotate in a helical pattern about the axis of rotation of units A and B, reacting against blades 25 forcing rotation of driven element 20. In coupling B, hydraulic action similarly functions in a well known manner wherein the hydraulic fluid rotates in a direction against the blades 28 causing driven element 22 also to rotate.

For purposes of illustration, assume that the torous of coupling A is filled with hydraulic fluid and that coupling B is void, clutches 70 and 132 are placed in a central position and clutch 96 is shifted to the right so as to engage layshaft AA with gear 92. Crossover valve 140 is also assumed to be in a neutral vertical position. Rotation of shaft 10 by the prime mover causes driving element 16 of coupling A to also rotate forcing, in turn, driven element 20 to follow in rotation. Torque then flows from driven element 20 through shaft 44 through gear 60 to gear 88 which is of greater diameter than gear 60, thus reducing the rotational speed and increasing the torque. These forces are then transferred through shaft AA to smaller gear 92 by means of the clutch 96 and further reduced in speed and increased in torque through its engagement with gear 97 on shaft 64. From there the forces are transmitted through output 68. It is thus seen that the ratio between gears 60 and 88 and between gears 92 and 97 effect a substantial reduction in output speed and increase in torque.

During the afore-described operation, unit B is void of hydraulic fluid and thus no torque is transmitted from its driving element 18 to its element 22.

When it is desired to effect a shift, fluid pressure is directed to chamber 153 resulting in crossover valve 140 being cocked in a clockwise position as seen in FIGURE 1. As the fluid is rotating within coupling A, it will be scooped up by valve 140 and transferred to coupling B. Because the fluid within unit A is rotating at a relatively high speed, valve 140 will dump it and fill unit B quickly. By filling unit B with fluid, torque is able to be transmitted from the driving element 18 to the driven element 22 whereas unit A now being empty is unable to transmit torque. When unit B is filled, chamber 153 is depressurized allowing the valve 140 to move back to a neutral position. Torque transmitted through coupling elements 18 and 22 follows a path through shaft 32, through gear set 39—124 to layshaft BB. Clutch 132 is shifted to the right engaging shaft BB with gear 130. Torque is then transmitted through gear 130 to gear 97 and out the output of shaft 64. By the selection of proper gear ratios, a reduction in speed and increase in torque is effected through gear sets 39—124 and 130—97. However, this ratio is designed to be less than that previously described ratio encountered through layshaft AA and gear 92.

When a further increase in speed is desired, chamber 150 is pressurized causing valve 140 to cock counterclockwise. This action dumps unit B and fills unit A in a manner as previous described. At the same time, or previously thereto, clutch 96 is shifted to the left to engage gear 90 with shaft AA. Torque now follows a path through shaft 44, gear sets 60—88, shaft AA, and through gears 90 and 94 and out the output 68 of shaft 64. When the shift is completed crossover valve 140 is again made to assume a neutral position.

When a still further increase in speed is desired, chamber 153 is pressurized dumping fluid from A to unit B and at the same time or just prior thereto, clutch 132 is shifted to the left. This results in torque being transmitted, through shaft AA, through gears 128 and 94 and out final shaft 64.

After this fourth shift has been accomplished chamber 151 may be pressurized causing valve 140 to cock in a counterclockwise direction again dumping fluid from unit B to unit A. Simultaneously therewith or just prior thereto clutch 96 is neutralized and clutch 70 is engaged so that a direct drive hook-up is accomplished through driven element 20 of unit A through shaft 44 through clutch 70 to driven shaft 64 and to its output 68.

It is thus seen that progressive steps of gear reduction are obtained in association with hydraulic couplings wherein the flow of fluid from one coupling to the other functions as a clutch to selectively establish a desired gear ratio.

An alternate form of the invention is disclosed in FIGURE 6 which functions in a manner similar to the transmission of FIGURE 1 but employs a modified means for dumping and filling the hydraulic units. In this construction two hydraulic couplings A' and B' are disposed side by side and have joined driving elements 316 and 318.

Coupling A has a driven element 320 splined at 340 to a central shaft 344. A hollow shaft 332 is splined at 333 to a member 350 secured to the driven element 322 of unit B'.

Hydraulic couplings A' and B' and the shafts 344 and 332 associated therewith engage output shaft 64 and layshafts AA and BB in a manner identical to that disclosed in FIGURE 1.

Means are provided for the flow of hydraulic fluid from one coupling to the other and include a valve element 360 which is of generally cylindrical shape and having a substantially annular shape longitudinal flow passage 362 through its body. Each of the outer ends 364 and 366 of element 360 are flared out to mate with the inner wall of the driven elements 320 and 322 in the couplings A' and B' which have recessed portions to receive the ends 364 and 366. Valve element 360 is slidably mounted on shaft 332 and is shorter in length than the distance between the outer walls 364 and 366 of driven elements 320 and 322 so that when element 360 is snug against the wall of one unit as seen in FIGURE 6, the flared portion on the other end of element 360 protrudes into the cavity of the other coupling. Radially directed inlet ports 368 and 370 are provided in the wall of coupling units A' and B' respectively, and a plurality of radial ports 371 are provided in the outer wall of valve element 360 to allow communication through ports 368 and 370 with couplings A' and B'.

Valve element 360 being slidably mounted on shaft 333 has an extreme longitudinal travel from the position where end 364 bears against coupling element 322 as shown in FIGURE 6, or to the position where end 366 bears against element 320 of coupling A'. Means are provided to effect a shift in element 360 from either of its two extreme positions. Valve element 360 has an inwardly directed radial flange 372 which meets with fluid tight engagement with shaft 332. An annular space is defined between shaft 332 and the body of element 360 which flange 372 bisects into annular chambers 374 and 376. These chambers are sealed at their outer ends by members 378 and 380. Hydraulic passages are provided to each of the chambers 374 and 376 for the purpose of applying fluid pressure to either side of flange 372 which functions as a piston. When fluid pressure is applied to chamber 374, valve element 360 will assume the position as shown in FIGURE 6 and when pressure is applied to chamber 376, valve element 360 will move to its extreme left hand position where end 366 will bear against driven element 320 of coupling A' and port 371 will align with port 360. In this extreme left hand position, end 364 will protrude into the cavity of coupling B'.

The transmission of FIGURE 6 will function in a manner similar to that of FIGURE 1; the modification in this case being the means for transmitting fluid from one coupling to the other. In FIGURE 6 when a shift is desired from one coupling to the other to effect a desired shift in gear ratio, pressure is applied to either of the chambers 374 or 376 so that valve element 360 will be moved toward that coupling through which torque is desired to be transmitted.

For purposes of illustration it is assumed that valve element 360 is in its left hand position and that coupling A' is filled with hydraulic fluid and is transmitting torque. By the application of pressure to chamber 374 valve element 360 will move to the right and assume a position as disclosed in FIGURE 6. At this point the hydraulic fluid circulated in coupling A' will be disrupted by the element end 366 which acts as a scoop and spoiler and directs the fluid flow into passage 362. This fluid flow will continue through passage 362 and out ports 371 and 370 into the cavity of coupling B' so that that coupling will become filled with fluid and able to transmit torque. Inasmuch as coupling A' will be voided, the transmission of torque from its driving element 316 to its driven element 320 will not be possible. To effect a further shift, that is, so that coupling A' will transmit torque, pressure is applied to chamber 376 moving valve element 360 to the left hand side. The flow of fluid from coupling B' to coupling A' takes place in a manner similar to that as described in connection with dumping coupling A' and filling coupling B'.

The operation of the gear sets connected with each of these couplings is identical to that described in connection with the transmission of FIGURE 1.

I claim:

1. In a transmission having a plurality of hydraulic drive units each comprising rotatable driving and driven members defining a working chamber, said driving members being joined in a juxtaposed back-to-back relationship, fluid control means for selectively transferring fluid between said units, said control means including a fluid transfer member which blocks fluid flow between the chambers when in a neutral position and which extends within the fluid flow stream in one of the chambers to intercept and transfer fluid to the other chamber when positioned on either side of the neutral position, and positioning means associated with said member to direct it to either of two fluid transferring positions.

2. In a hydraulic transmission having a pair of toroidally shaped drive units, said units each comprising rotatable driving and driven members defining a working chamber, the driving members of said units being joined in a back-to-back relationship, fluid control means associated with said units for selectively transferring fluid directly from the working chamber of one unit to the working chamber of the other unit, said means including a communicating passageway at the juncture of said driving members, a fluid transfer member movably disposed in said communicating passageway and which member blocks fluid flow between the chambers when in a neutral position and further which extends within the fluid flow stream in one of said chambers to intercept and transfer fluid to the other chamber when positioned on either side of the neutral position, and positioning means associated with said member to direct it to either of two fluid transfer positions.

3. In a hydraulic transmission having a pair of toroidal drive units, said units each comprising rotatable driving and driven members defining a working chamber, said driving members being joined in a back-to-back relationship, fluid control means for selectively transferring fluid directly from the working chamber of one unit to the working chamber of the other unit, said control means including a plurality of circumferentially spaced passageways at the juncture of said driving members, fluid transfer members associated with each of said passageways which block fluid flow between the chambers when in a neutral position and further which extend within the fluid flow stream in one of the chambers to intercept and transfer fluid to the other chamber when positioned on either side of the neutral position, and positioning means for activating said members in unison to direct them to either of two fluid transferring positions.

References Cited in the file of this patent

UNITED STATES PATENTS

| 1,987,985 | Bauer et al. | Jan. 15, 1935 |
| 2,240,270 | Schaefer | Apr. 29, 1941 |
| 2,488,478 | Roberts | Nov. 15, 1949 |
| 2,654,261 | Youngren et al. | Oct. 6, 1953 |
| 2,674,905 | O'Brien | Apr. 13, 1954 |
| 2,687,195 | Gleason | Aug. 24, 1954 |
| 2,696,081 | Kiep | Dec. 7, 1954 |
| 2,745,296 | Seybold | May 15, 1956 |

FOREIGN PATENTS

| 815,133 | Germany | Sept. 27, 1951 |